(12) United States Patent
Sako

(10) Patent No.: US 10,114,593 B2
(45) Date of Patent: Oct. 30, 2018

(54) INFORMATION PROCESSING APPARATUS THAT REQUIRES AUTHENTICATION OF USER, CONTROL METHOD THEREFOR, AND STORAGE MEDIUM

(71) Applicant: CANON KABUSHIKI KAISHA, Tokyo (JP)

(72) Inventor: Ritsuto Sako, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/805,795

(22) Filed: Jul. 22, 2015

(65) Prior Publication Data

US 2016/0026414 A1    Jan. 28, 2016

(30) Foreign Application Priority Data

Jul. 25, 2014    (JP) .................................. 2014-151863

(51) Int. Cl.
*G06F 3/12*       (2006.01)
*H04B 5/00*       (2006.01)

(52) U.S. Cl.
CPC .......... *G06F 3/1222* (2013.01); *G06F 3/1236* (2013.01); *G06F 3/1238* (2013.01); *G06F 3/1292* (2013.01); *H04B 5/0025* (2013.01); *H04B 5/0031* (2013.01)

(58) Field of Classification Search
None
See application file for complete search history.

(56) References Cited

U.S. PATENT DOCUMENTS

| | | | | |
|---|---|---|---|---|
| 9,100,426 B1* | 8/2015 | Fang | ..................... | G06F 21/50 |
| 2006/0101280 A1* | 5/2006 | Sakai | ..................... | G06F 21/35 |
| | | | | 713/184 |
| 2012/0322391 A1* | 12/2012 | Suzuki | ................. | H04W 12/06 |
| | | | | 455/68 |
| 2013/0208310 A1* | 8/2013 | Nakashima | ........ | H04N 1/00244 |
| | | | | 358/1.15 |
| 2013/0258390 A1 | 10/2013 | Suzuki et al. | | |

(Continued)

FOREIGN PATENT DOCUMENTS

| | | |
|---|---|---|
| CN | 101253469 A | 8/2008 |
| CN | 102195684 A | 9/2011 |

(Continued)

OTHER PUBLICATIONS

Laravel Brook (2013) https://web.archive.org/web/20130130042019/http://laravelbook.com/laravel-user-authentication.*

(Continued)

*Primary Examiner* — Huo Long Chen
(74) *Attorney, Agent, or Firm* — Rossi, Kimms & McDowell LLP

(57) ABSTRACT

An information processing apparatus which allows execution of NFC touch-to-print printing on condition that user authentication is successful, thus preventing NFC touch-to-print printing from being performed by every user. The information processing apparatus is equipped with an NFC (near-field communication) unit which has a memory. When authentication of a user is successful, connecting information for an external device to connect to the information processing apparatus is written into the memory.

5 Claims, 16 Drawing Sheets

(56) References Cited

U.S. PATENT DOCUMENTS

| | | | |
|---|---|---|---|
| 2013/0258402 A1* | 10/2013 | Arai | H04N 1/00344 358/1.15 |
| 2014/0094117 A1* | 4/2014 | Rajendran | H04W 12/04 455/41.1 |
| 2014/0240776 A1* | 8/2014 | Suzuki | G06F 3/1296 358/1.15 |
| 2014/0293980 A1* | 10/2014 | Shibata | H04W 88/06 370/338 |
| 2014/0355048 A1* | 12/2014 | Kang | G06F 3/1292 358/1.15 |
| 2015/0038086 A1* | 2/2015 | Kim | H04W 4/008 455/41.3 |
| 2015/0093992 A1* | 4/2015 | Tanaka | H04B 5/0031 455/41.2 |

FOREIGN PATENT DOCUMENTS

| | | |
|---|---|---|
| CN | 103369171 A | 10/2013 |
| JP | 2013214139 A | 10/2013 |

OTHER PUBLICATIONS

Allowing printing without authentication on a Konica Minolta MFP (Apr. 20, 2013) http://docs.sepialine.com/display/kb7/Allowing+printing+without+authentication+on+a+Konica+Minolta+MFP.*
Office Action issued in Chinese Application No. 201510441037.2 dated Aug. 30, 2017. English translation provided.

* cited by examiner

| ID | PASSWORD |
|---|---|
| user1 | pass1 |
| user2 | pass2 |
| user3 | pass3 |

FIG. 10

| ID 1001 | PASSWORD 1002 | AUTHORITY | | | |
|---|---|---|---|---|---|
| | | COPY 1003 | FAX 1004 | PC-PRINT 1005 | NFC TOUCH-TO-PRINT PRINTING 1006 |
| user1 | pass1 | OK | OK | OK | OK |
| user2 | pass2 | OK | OK | OK | NG |
| user3 | pass3 | OK | OK | NG | NG |

1000

INFORMATION PROCESSING APPARATUS THAT REQUIRES AUTHENTICATION OF USER, CONTROL METHOD THEREFOR, AND STORAGE MEDIUM

BACKGROUND OF THE INVENTION

Field of the Invention

The present invention relates to an information processing apparatus that requires authentication of a user, a control method therefor, and a storage medium.

Description of the Related Art

In recent years, information processing apparatuses (image forming apparatuses) such as MFPs having various wireless communication functions, for example, image forming apparatuses having a NFC (near-field communication) communication function and network communication functions such as wireless LAN, and Bluetooth (registered trademark) have been offered on the market. Further, there has been proposed a printing method using NFC communication according to which a print job is sent from a mobile terminal such as a smartphone having the NFC communication function to an image forming apparatus having the communication functions mentioned above, and the image forming apparatus executes the print job (see, for example, Japanese Laid-Open Patent Publication (Kokai) No. 2013-214139).

Specifically, according to the printing method described in Japanese Laid-Open Patent Publication (Kokai) No. 2013-214139, upon detecting a mobile terminal 100 coming within an NFC communication zone of an image forming apparatus 200, the image forming apparatus 200 establishes NFC communication with the mobile terminal 100. After that, as shown in FIG. 18, the image forming apparatus 200 sends information on the image forming apparatus 200 (such as an IP address) to the mobile terminal 100 so as to shift into a higher speed network communication using a wireless LAN or Bluetooth (registered trademark) (step S1801).

The mobile terminal 100 then connects to the image forming apparatus 200 by high-speed network communication based on the received information on the image forming apparatus 200 (step S1802), and sends a print job to the image forming apparatus 200 by high-speed network communication (step S1803). After that, the image forming apparatus 200 executes the received print job. In this case, a printing method that establishes NFC communication by holding the mobile terminal 100 over the image forming apparatus 200, and as a result, causes the image forming apparatus 200 to execute a print job is referred to as "NFC touch-to-print printing".

The image forming apparatus 200 to which the mobile terminal 100 is connected by NFC communication has an NFC unit for NFC communication. In the NFC unit, various information (hereafter referred to as "NDEF information") is set as NDEF (NFC data exchange format), and when NFC communication is established between the image forming apparatus 200 and the mobile terminal 100, the image forming apparatus 200 sends NDEF information to the mobile terminal 100. It should be noted that information which uniquely identifies the image forming apparatus 200 on a network so as to shift into the high-speed network communication described above is an example of NDEF information.

Some image forming apparatuses have a user authentication function, and if execution of NFC touch-to-print printing is allowed when user authentication has not been performed (in other words, when user authentication is unsuccessful), every user such as an unauthorized user may perform NFC touch-to-print printing.

SUMMARY OF THE INVENTION

The present invention provides an information processing apparatus and a control method therefor, which allow execution of NFC touch-to-print printing on condition that user authentication is successful, thus preventing NFC touch-to-print printing from being performed by every user, as well as a storage medium.

Accordingly, the present invention provides an information processing apparatus comprising an authentication unit configured to perform authentication of a user, an NFC (near-field communication) communication unit configured to have a memory, and a writing unit configured to write information into the memory, wherein when authentication of the user by the authentication unit is successful, the writing unit writes, into the memory, connecting information for an external device to connect to the information processing apparatus.

According to the present invention, since execution of NFC touch-to-print printing is allowed on condition that user authentication is successful, NFC touch-to-print printing is prevented from being performed by every user.

Further features of the present invention will become apparent from the following description of exemplary embodiments (with reference to the attached drawings).

BRIEF DESCRIPTION OF THE DRAWINGS

FIG. 10 is a view useful in explaining a user information database which is used in a second embodiment of the present invention and in which available functions are set with respect to each of users.

DESCRIPTION OF THE EMBODIMENTS

The present invention will now be described in detail with reference to the drawings showing embodiments thereof.

First, a description will be given of a first embodiment of the present invention.

Figure 1:
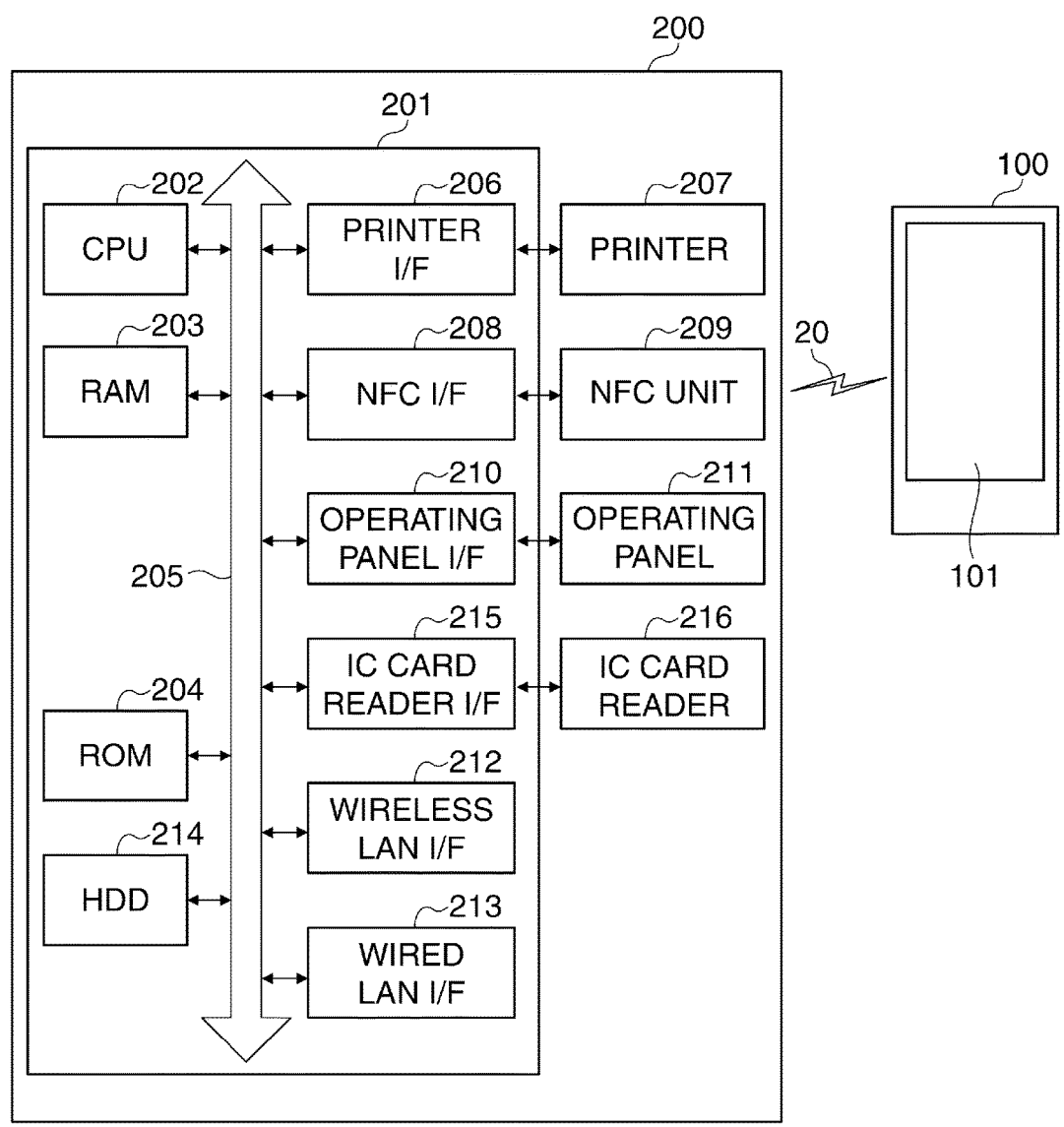
FIG. 1 is a block diagram schematically showing a hardware arrangement of a printing system according to a first embodiment of the present invasion.

FIG. 1 is a block diagram schematically showing a hardware arrangement of a printing system according to embodiments of the present invention.

Referring to FIG. 1, the printing system 10 has a mobile terminal 100 (external device) comprised of mobile device such as a smartphone, and an image forming apparatus (information processing apparatus) 200 comprised of, for example, an MFP. The mobile terminal 100 and the image forming apparatus 200 are connected together by NFC communication 20 and also connected together by higher-speed network communication using a wireless LAN or Bluetooth (registered trademark).

The image forming apparatus 200 has a control unit 201 including a CPU 202, a printer 207, an NFC unit 209 (NFC communication unit), an operating panel 211, and an IC card reader 216 (authentication unit).

The control unit 201 controls operation of component elements of the image forming apparatus 200. The control unit 201 has the CPU 202, a RAM 203, a ROM 204, a printer I/F 206, an NFC I/F 208, an operating panel I/F 210, a wireless LAN I/F 212, a wired LAN I/F 213, an HDD 214, and an IC card reader I/F 215. The CPU 202 reads out control programs stored in the ROM 204 to provide a variety of control such as communication control. The CPU 202 also processes image data input from the wireless LAN I/F 212 and the wired LAN I/F 213 and outputs the processed image data as recording image signals to the printer I/F 206. The RAM 203 is used as a temporary storage area such as a main memory or a work area for the CPU 202. The HDD 214 stores data, various programs, or various information tables. The printer I/F 206 acts as an interface which outputs image signals to the printer 207.

The NFC I/F 208 acts as an interface which reads and writes NDEF information from and into the NFC unit 209. The NFC unit 209 is comprised of an antenna (not shown) for carrying out NFC communications and a memory (not shown) in which information is allowed to be written. NDEF information is stored in this memory. When NFC communication is established between the mobile terminal 100 and the image forming apparatus 200, NDEF information written in the memory of the NFC unit 209 (NDEF information stored in the memory of the NFC unit 209) is sent to the mobile terminal 100.

The operating panel I/F 210 connects the operating panel 211 and the control unit 201 together. The operating panel 211 has a display panel 314, to be described later, which has a touch panel function, as well as a keyboard and others. The IC card reader I/F 215 connects the IC card reader 216 and the control unit 201 together. The IC card reader 216 is a device for reading contents of an IC card and used to perform authentication of a user who uses an IC card.

The wireless LAN I/F 212 sends information to an external device such as the mobile terminal 100 or receives a variety of information from the external device by way of a wireless LAN which is a high-speed communication means. The wired LAN I/F 213 sends information to the external device or receives a variety of information from the external device by way of a wired LAN (Ethernet (registered trademark)) which is a high-speed communication means. It should be noted that the blocks in the control unit 201 are connected together by a system bus 205.

The mobile terminal 100 has an NFC reader (not shown) for implementing NFC communications and also has a liquid crystal panel 101 which displays a variety of information.

Figure 2:
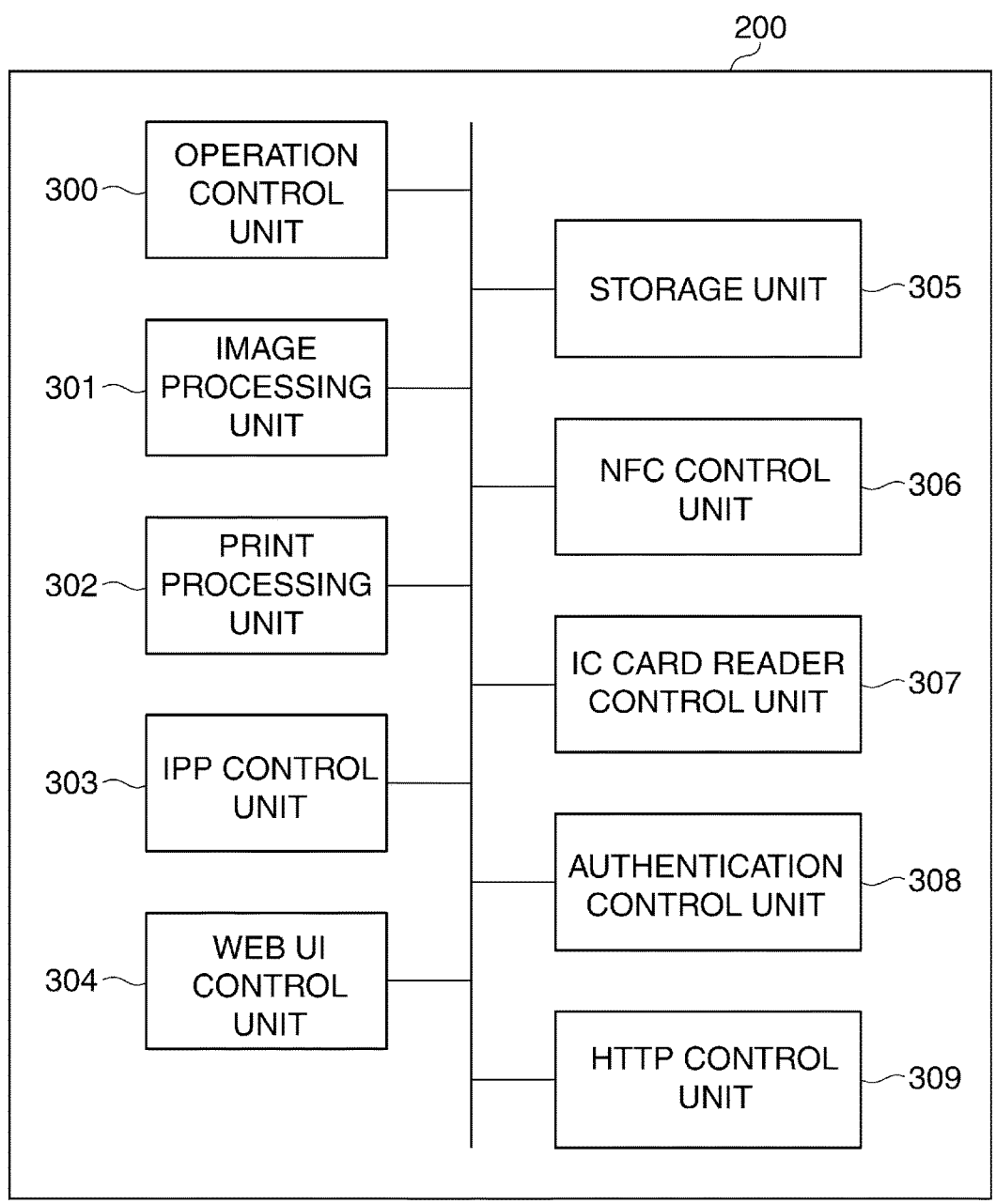
FIG. 2 is a diagram useful in explaining a software arrangement of the image forming apparatus (information processing apparatus) in FIG. 1.

FIG. 2 is a diagram useful in explaining a software arrangement of the image forming apparatus in FIG. 1.

Referring to FIG. 2, when the CPU 202 of the image forming apparatus 200 is to execute control programs, an operation control unit 300, an image processing unit 301, a printing process unit 302, an IPP control unit 303, a Web UI control unit 304, a storage unit 305, an NFC control unit 306 (writing unit), an IC card reader control unit 307, an authentication control unit 308, and an HTTP control unit 306 are implemented as modules (functional units) in the image forming apparatus 200.

The operation control unit 300 controls the operating panel 211. The controlled operating panel 211 displays an operation menu to stand by until it receives an instruction input by a user, notifies the other modules of the instruction input by the user, and also displays the instruction input by the user.

Figure 3:
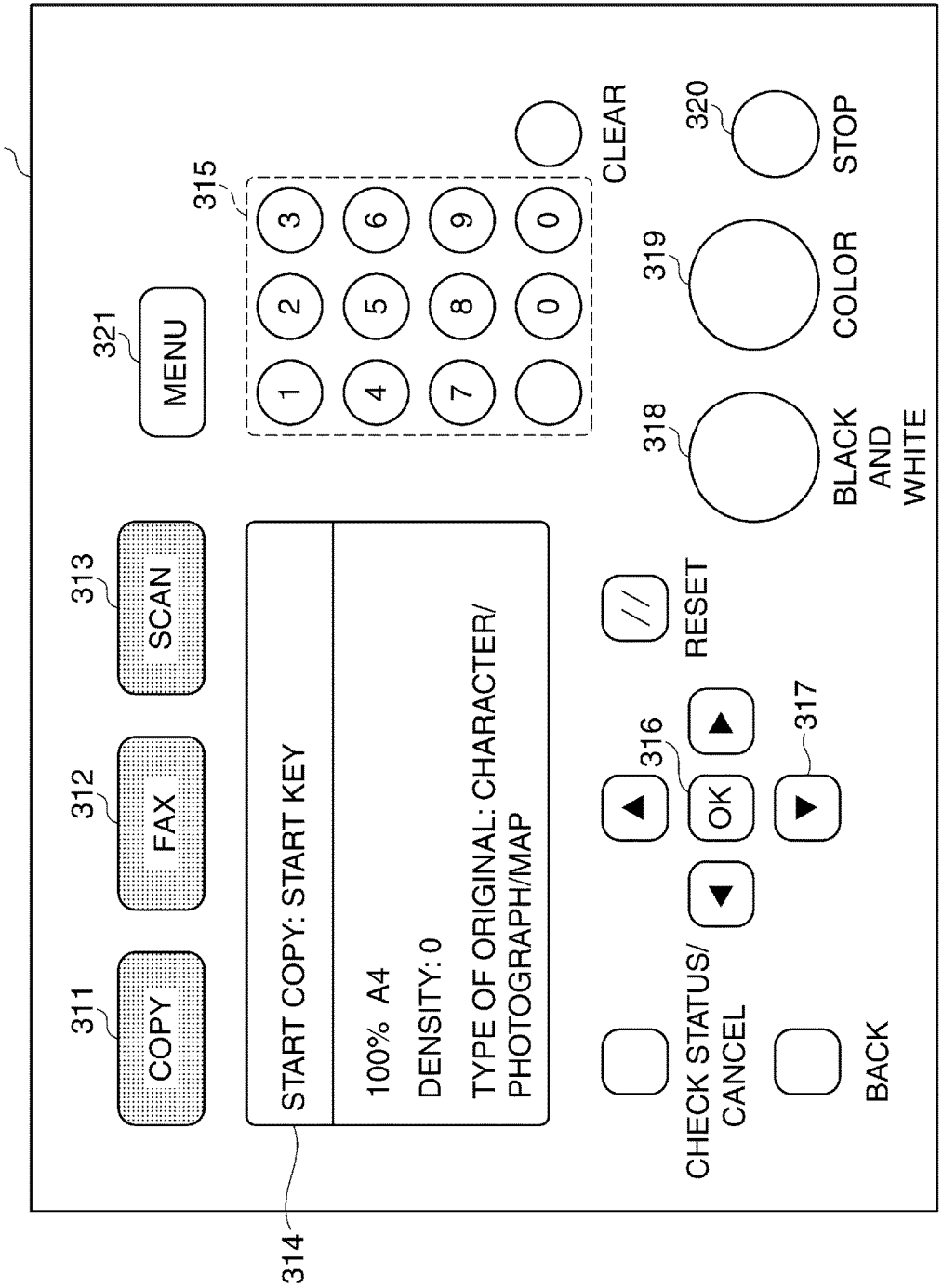
FIG. 3 is a view useful in explaining an operating panel of the image forming apparatus.

FIG. 3 is a view useful in explaining the operating panel 211 of the image forming apparatus 200.

The operating panel 211 has a copy button 311, a FAX button 312, a scan button 313, the display panel 314 for which an LCD or the like is used, a numeric keypad 315, an OK key 316, a direction key 317, a black-and-white copy button 318, a color copy button 319, a stop button 320, and a menu button 321.

The copy button 311 is depressed by a user when he or she makes a copy using the image forming apparatus 200, and when the copy button 311 is depressed, a copy operation screen is displayed on the display panel 314. The FAX button 312 is depressed by a user when he or she sends a facsimile using the image forming apparatus 200, and when the FAX button 312 is depressed, a FAX operation screen is displayed on the display panel 314.

The scan button 313 is depressed by a user when he or she performs scanning using the image forming apparatus 200, and the scan button 313 is depressed, a scan operation screen is displayed on the display panel 134. The numeric keypad 315 is used to input, for example, numerals. The OK key 316 is used to, for example, confirm an instruction entered on the display panel 314. The direction key 317 is used to, for example, choose a menu displayed on the display panel 314.

The black-and-white copy button 318 and the color copy button 319 are used by a user when he or makes a black-and-white copy and a color copy, respectively. The stop button 320 is used by a user to stop a process carried out in the image forming apparatus 200 such as a printing process. The menu button 321 is used to display a menu screen, which is for use in configuring settings on the image forming apparatus 200, on the display panel 314.

Referring to FIG. 2 again, the image processing unit 301 renders a print job as image data for printing. The printing process unit 302 sends the image data, which was obtained as a result of rendering by the image processing unit 301, as an image signal to the printer 207 via the printer I/F 206 and causes the printer 207 to perform printing.

The storage unit 305 stores data, which is designated by other modules, in the ROM 204 and the HDD 214 or reads out data stored in the ROM 204 and the HDD 214. Examples of data stored by the storage unit 305 include information for use in performing authentication of a user (hereafter referred to as "authentication information").

The NFC control unit 306 writes (stores) NDEF information in the NFC unit 209 or reads out NDEF information from the NFC unit 209. The IC card reader control unit 307 reads out IC card information from the IC card reader 216. Examples of IC card information include user information for use in authentication of a user, such as identification numbers (ID) and passwords.

The authentication control unit 308 performs authentication of a user (for example, a login process) using authentication information stored in the storage unit 305. The HTTP control unit 309 controls HTTP. The IPP control unit 303 controls IPP running on HTTP. The Web UI control unit 304 controls, for example, display of Web UI contents running on HTTP.

Figures 4, 5:
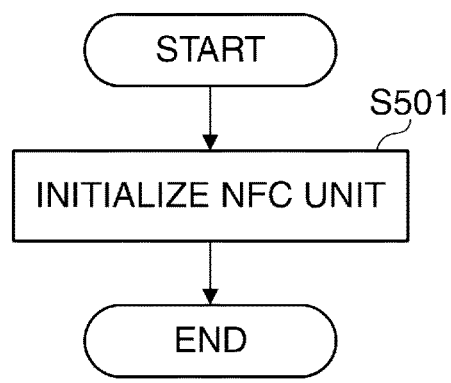
FIG. 4 is a view useful in explaining a user information database which is authentication information stored in a storage unit in FIG. 2.
FIG. 5 is a flowchart showing an NFC unit initialization process which is carried out at the start of the image forming apparatus according to the first embodiment of the present invention.

FIG. 4 is a view useful in explaining a user information database 410 which is authentication information stored in the storage unit 305 in FIG. 2.

The user information database 410 is used, for example, when the authentication control unit 308 performs authentication in step S602 in a process in FIG. 6, to be described later. In the user information database 410, ID information on users is set in an ID column 411. In the present embodiment, for example, user 1, user 2, and user 3 are set as ID information on three users. In a password column 412, password information corresponding to the respective pieces of ID information is set. In the present embodiment, for example, pass 1, pass 2, and pass 3 are set correspondingly to user 1, user 2, and user 3, respectively.

A description will now be given of a printing method using NFC communication according to the present embodiment. In the following description of a series of processes in the printing method using NFC communication according to the present embodiment, a process at startup of the image forming apparatus 200, a process at the time of user authentication by the image forming apparatus 200, and a process at the time of establishment of an NFC communication between the image forming apparatus 200 and the mobile terminal 100 will be described separately, and they are carried out in order.

In NFC communication, NDEF information is sent from the NFC unit 209 of the image forming apparatus 200 to the mobile terminal 100, and examples of NDEF information include device identifying information for uniquely identifying the image forming apparatus 200 on a network, such as an IP address of the image forming apparatus 200.

NDEF information is comprised of a plurality of NDEF records, and for example, the device identifying information mentioned above and connecting information for connecting the mobile terminal 100 to the image forming apparatus 200 using Bluetooth (registered trademark) are set as NDEF records. Namely, according to functions desired to be implemented, a variety of information is allowed to be set as NDEF records. For example, when a predetermined application is desired to be started in the image forming apparatus 200 from the mobile terminal 100, information for use in identifying and calling this predetermined application is set as an NDEF record. It should be noted that NDEF and details such as formats of NDEF records are defined by the NFC forum which is a standardization group.

In the above described manner, information required to implement NFC touch-to-print printing (hereafter also referred to as "NFC touch-to-print printing information") is allowed to be set as an NDEF record in NDEF information. In this case, when NFC communication is established between the image forming apparatus 200 and the mobile terminal 100, NFC touch-to-print printing information is sent to the mobile terminal 100, and based on the received NFC touch-to-print printing information, the mobile terminal 100 easily causes the image forming apparatus 200 to perform NFC touch-to-print printing. Accordingly, in the present embodiment, NFC touch-to-print printing information is set as an NDEF record of NDEF information.

First, a description will be given of process at startup of the image forming apparatus 200 according to the present embodiment.

FIG. 5 is a flowchart showing an NFC unit initialization process which is carried out at startup of the image forming apparatus 200.

Referring to FIG. 5, the NFC control unit 306 of the image forming apparatus 200 initializes the NFC unit 209 by way of the NFC I/F 208 (step S501). The initialized state of the NFC unit 209 means a state in which no information is set as NDEF information. Even when a user logs out of the image forming apparatus 200 which he or she has logged into (or for which he or she has been authenticated), the process in FIG. 5 is carried out, in which the NFC control unit 306 initializes the NFC unit 209 by way of the NFC I/F 208 (step S501). After that, the present process is terminated.

A description will now be given of a process at the time of user authentication by the image forming apparatus 200 according to the present embodiment. It should be noted that in the present embodiment, it is assumed that a user of the mobile terminal 100 owns an IC card (not shown), and this IC card and the IC card reader 216 of the image forming apparatus 200 are used.

Figure 6:
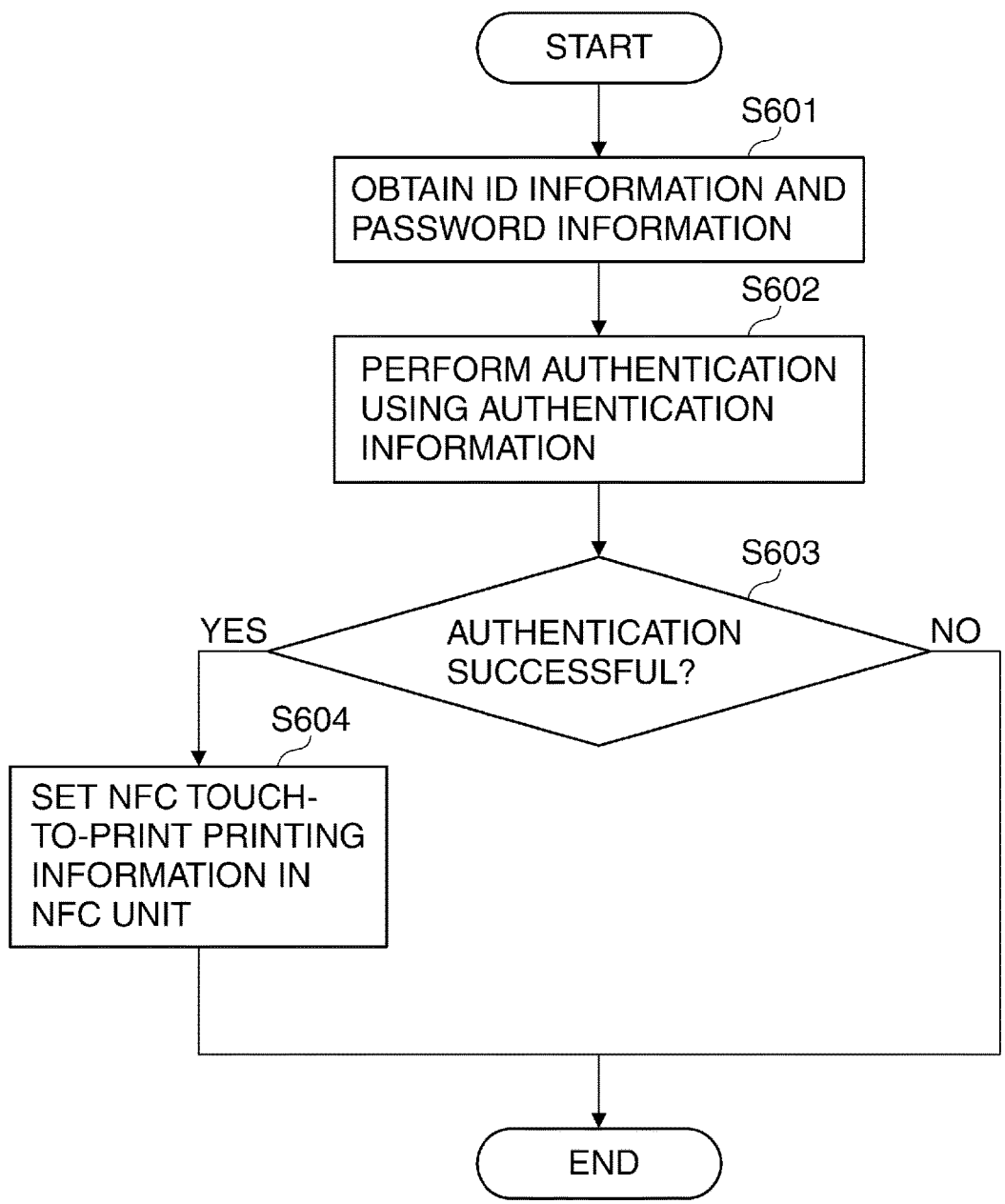
FIG. 6 is a flowchart showing a user authentication process carried out by the image forming apparatus according to the first embodiment of the present invention.

FIG. 6 is a flowchart showing a user authentication process carried out by the image forming apparatus 200.

Referring to FIG. 6, first, the IC card reader control unit 307 of the image forming apparatus 200 causes the IC card reader 216 to obtain ID information and password information on the user from the IC card by way of the IC card reader I/F 215 (step S601).

Next, the authentication control unit 308 performs authentication of the user by comparing the obtained ID information and password information with the user information database 410 (authentication information) stored in the storage unit 305 (step S602) and determines whether or not authentication of the user is successful (step S603).

As a result of the determination in the step S603, when authentication of the user is successful (YES in the step S603), the NFC control unit 306 sets NFC touch-to-print printing information as an NDEF record in the NFC unit 209 by way of the NFC I/F 208 (step S604) and terminates the present process. Specifically, NFC touch-to-print printing information is written into memory of the NFC unit 209 in the step S604.

On the other hand, when authentication of the user is unsuccessful (NO in the step S603), the present process is immediately terminated. Namely, when authentication of the user is unsuccessful, the initialized state of the NFC unit 209 is maintained.

Figure 7:
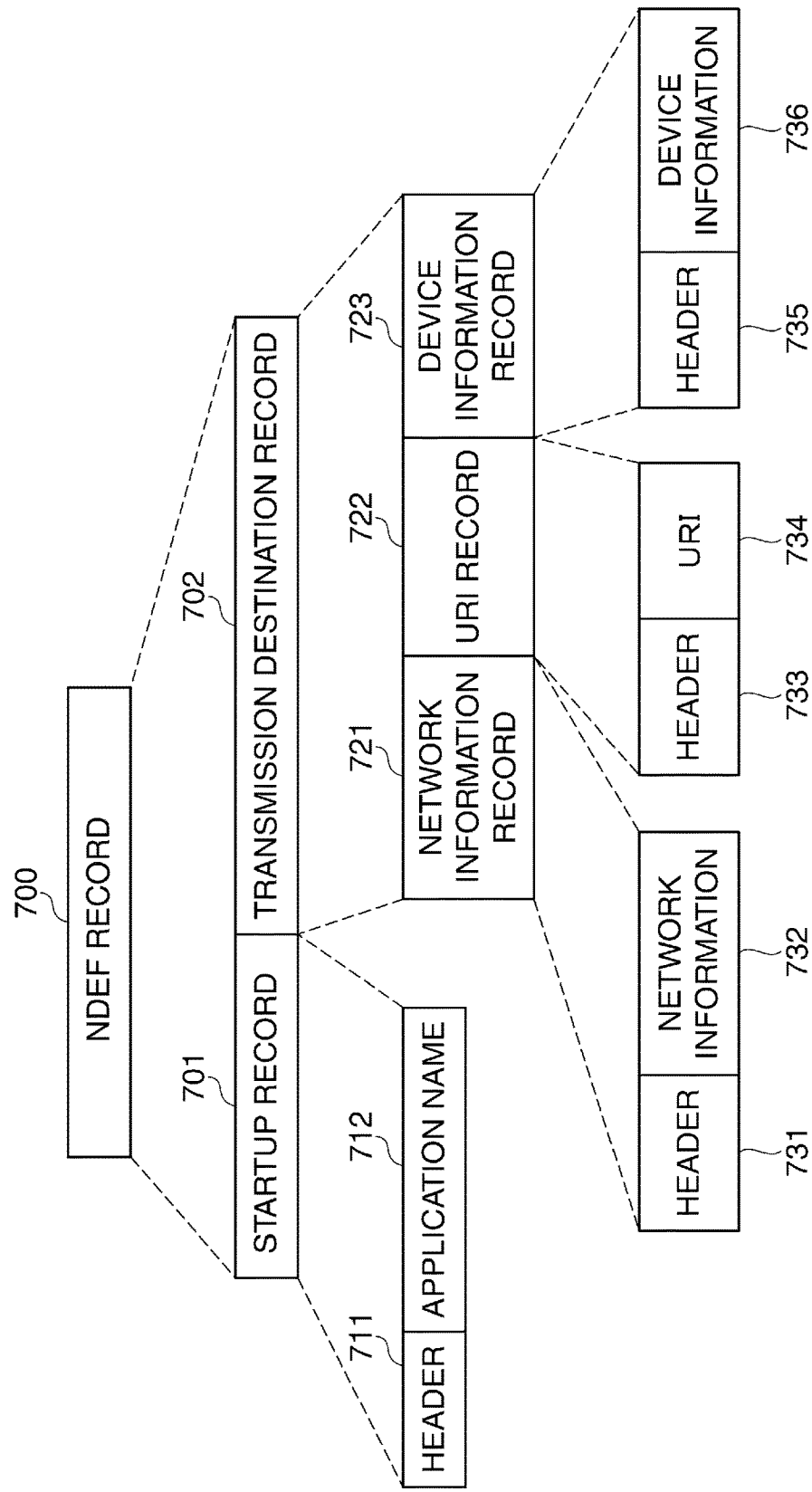
FIG. 7 is a view useful in explaining an arrangement of NFC touch-to-print printing information set as an NDEF record in step S604 in FIG. 6.

FIG. 7 is a view useful in explaining an arrangement of the NFC touch-to-print printing information set as the NDEF record in the step S604 in FIG. 6.

Referring to FIG. 7, the NDEF record 700 in which the NFC touch-to-print printing information is set has a startup record 701 for starting execution of NFC touch-to-print printing, and a transmission destination record 702 in which information required to perform NFC touch-to-print printing is stored.

In the startup record 701, startup information which is information required for the mobile terminal 100, to which the NFC touch-to-print printing information set in the NDEF record 700 is transmitted, to perform NFC touch-to-print printing. Specifically, the startup record 701 is comprised of a header 711 in which header information on the startup information is set, and an application name 712 in which a name of an application required to perform NFC touch-to-print printing (hereafter referred to merely as "the required application") is set.

Here, in the header 711, information indicating that the startup record 701 is a record for starting the required application is set in a format defined by the NFC forum. A character string including a name of NFC touch-to-print printing is set as the application name 712.

The transmission destination record 702 is comprised of three records, that is, a network information record 721, a URI record 722, and a device information record 723.

The network information record 721 is comprised of a header 731 and network information 723. In the header 731, information indicating that the network information record 721 is a record in which network information is stored is set in a format defined by the NFC forum. Information for identifying the image forming apparatus 200, which is caused to perform NFC touch-to-print printing, on a network (for example, a wireless LAN or Bluetooth (registered trademark)) is set as the network information 732. For example, an IP address, a MAC address, a UUID, etc. of the image forming apparatus 200 are set as the network information 732.

The URI record 722 is comprised of a header 733 and a URI (uniform resource identifier) 734. In the header 733, information indicating that the URI record 722 is a record in which a URI is stored is set in a format defined by the NFC forum. A URI for use in sending print data to the IPP control unit 303 of the image forming apparatus 200 using the internet printing protocol (IPP) when NFC touch-to-print printing is performed is set as the URI 734.

The device information record 723 is comprised of a header 735 and device information 736. In the header 735, information indicating that the device information record 723 is a record in which device information is stored is set in a format defined by the NFC forum. Device information on the image forming apparatus 200, which is caused to perform NFC touch-to-print printing, is set as the device information 736. For example, a vendor name, a model name, a product name, etc. of the image forming apparatus 200 are set as the device information 736.

In the NDEF record 700, records other than the records 721 to 723 described above may be set in the transmission destination record 702, or only a part of the records 721 to 723 described above may be set, but it is preferred that at least information for identifying the image forming apparatus 200, which is caused to perform NFC touch-to-print printing, on a network is set. Also, records other than the startup record 701 and the transmission destination record 702 may be set in the NDEF record 700.

When the NDEF record 700 is sent to the mobile terminal 100, the mobile terminal 100 identifies the image forming apparatus 200, which is caused to perform NFC touch-to-print printing, on a network based on the network information 732 and starts the required application, which has been identified based on the application name 712, in the image forming apparatus 200. The user of the mobile terminal 100 thus easily implements NFC touch-to-print printing.

A description will now be given of a process carried out when NFC communication is established between the image forming apparatus 200 and the mobile terminal 100 according to the present embodiment.

After a user of the mobile terminal 100 logs in to the image forming apparatus 200 using an IC card (the user is authenticated by the image forming apparatus 200), the user may log out of the image forming apparatus 200 before he or she tries NFC touch-to-print printing using the mobile terminal 100.

In this case, the image forming apparatus 200 does not know whether or not the user who is trying NFC touch-to-print printing using the mobile terminal 100 has the authority to log in to the image forming apparatus 200, and hence the image forming apparatus 200 may discontinue NFC touch-to-print printing from the standpoint of ensuring security. In this case as well, the present process is carried out so that the user can know the cause of a failure in NFC touch-to-print printing.

Figure 8:
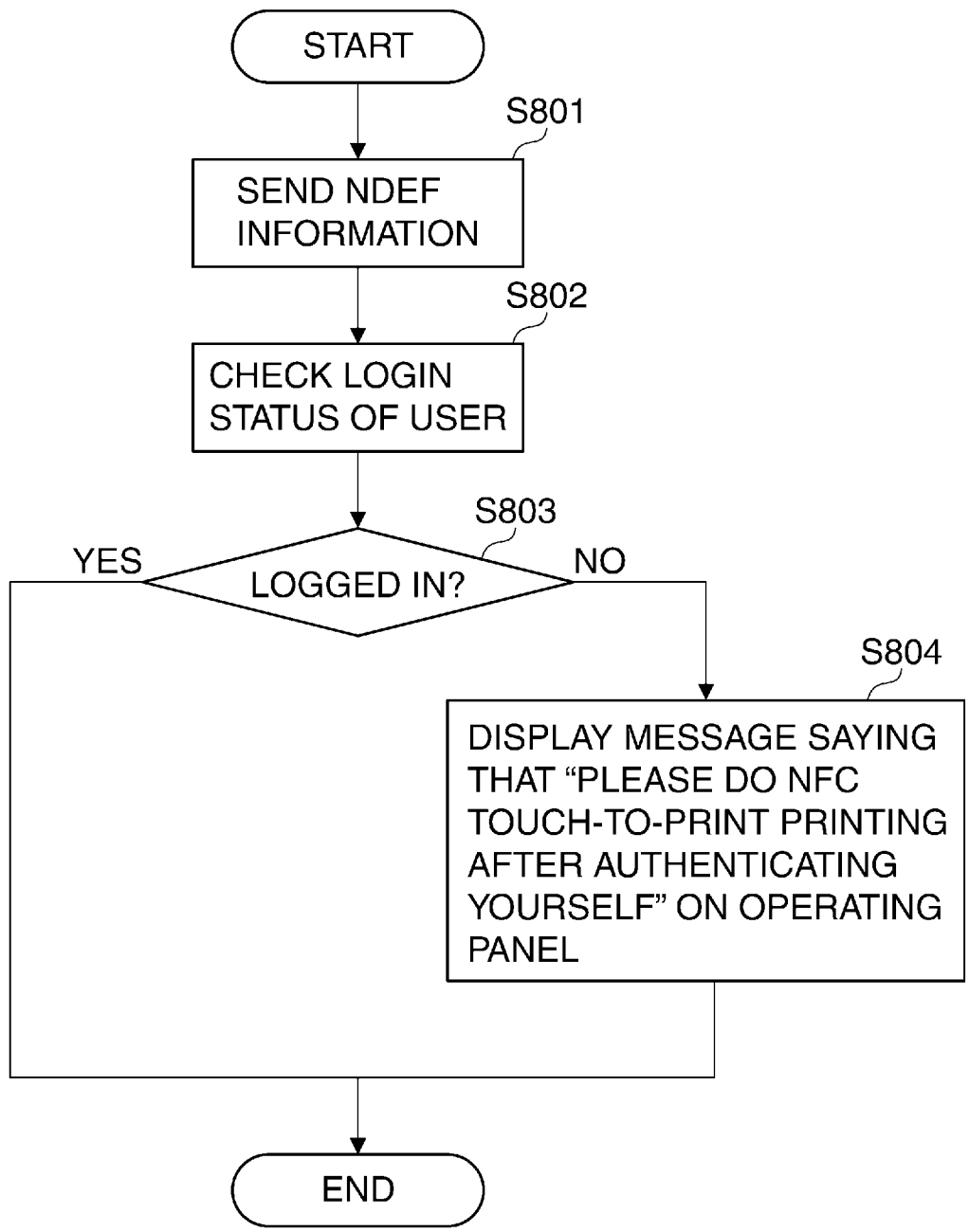
FIG. 8 is a flowchart showing a user authority checking process which is carried out by the image forming apparatus according to the first embodiment of the present invention.

FIG. 8 is a flowchart showing a user authority checking process which is carried out by the image forming apparatus 200.

Referring to FIG. 8, first, when the mobile terminal 100 running in a card emulation mode is positioned within an NFC communication zone of the image forming apparatus 200, and further, the image forming apparatus 200 detects the mobile terminal 100, NFC communication is established between the mobile terminal 100 and the image forming apparatus 200.

Next, the NFC control unit 306 of the image forming apparatus 200 sends NDEF information set in the NFC unit 209 to the mobile terminal 100 (step S801). When authentication of the user was successful in the step S603, NFC touch-to-print printing information is sent as NDEF information to the mobile terminal 100. On the other hand, when authentication of the user was unsuccessful in the step S603, the initialized state of the NFC unit 209 is maintained, and hence substantially no information is sent as NDEF information to the mobile terminal 100.

Then, the authentication control unit 308 of the image forming apparatus 200 checks if the user has logged in to the image forming apparatus 200 (step S802) and determines whether or not the user has logged in to the image forming apparatus 200 (step S803).

As a result of the determination in the step S803, when the user has logged in to the image forming apparatus 200 (YES in the step S803), the image forming apparatus 200 performs NFC touch-to-print printing and terminates the present process. It should be noted that when the user has logged in to the image forming apparatus 200, this means that it is determined that authentication of the user was successful in the step S603, and hence the NDEF information sent to the image forming apparatus 200 is NFC touch-to-print printing information. Therefore, the user of the mobile terminal 100 causes the image forming apparatus 200 to perform NFC touch-to-print printing.

Figure 9:
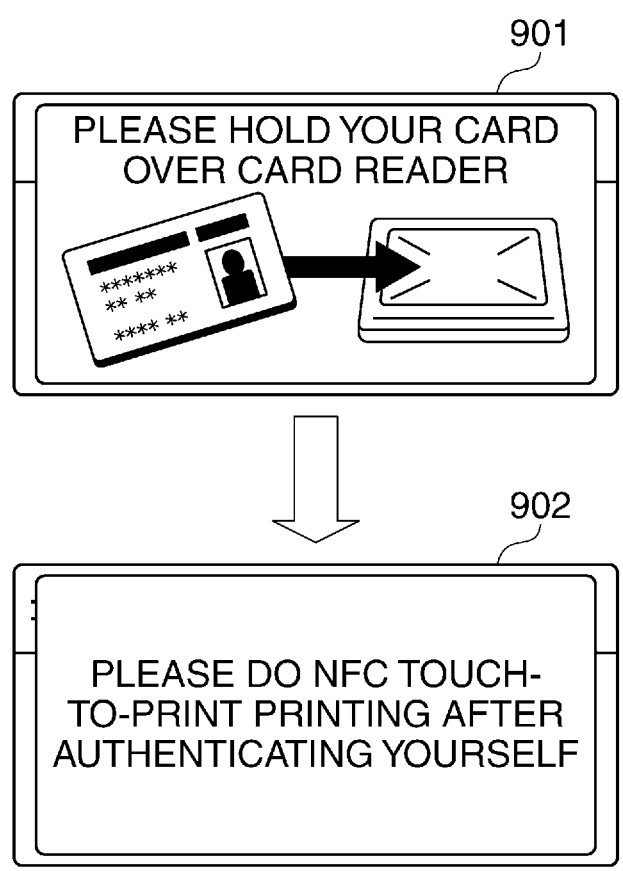
FIG. 9 is a view useful in explaining a change in display on a display panel which is made when it is determined in step S803 in FIG. 8 that user authentication is unsuccessful.

On the other hand, when the user has logged out of the image forming apparatus 200 (NO in the step S803), that is, when it is determined that authentication of the user was unsuccessful in the step S603, the image forming apparatus 200 changes the display on the display panel 314 from a login awaiting display 901 as shown in FIG. 9 to a display 902 which prompts authentication (login) of the user such as a message saying that "Please do NFC touch-to-print printing after authenticating yourself" (step S804). After that, the image forming apparatus 200 discontinues NFC touch-to-print printing and terminates the present process.

According to the process in FIG. 8, when it is determined that a user of the mobile terminal 100 has successfully been authenticated, this user is allowed to cause the image forming apparatus 200 to perform NFC touch-to-print printing, and this prevents NFC touch-to-print printing from being performed by every user.

Moreover, according to the process in FIG. 8, when NFC touch-to-print printing is discontinued due to unsuccessful authentication of a user who tries to perform NFC touch-to-print printing, the display 902 which prompts authentication of the user is displayed on the display panel 314, and this tells the user the reason why NFC touch-to-print printing has been discontinued (the user has logged out).

Further, according to the process in FIG. 6, when authentication of a user by the image forming apparatus 200 is unsuccessful, the initialized state of the NFC unit 209 is maintained, and therefore, even when NFC communication is established after that, and NDEF information is sent to the mobile terminal 100, a user of the mobile terminal 100 is not allowed to cause the image forming apparatus 200 to perform NFC touch-to-print printing. Namely, a user who has not been authenticated, in other words, a user who does not have the authority to log in to the image forming apparatus 200 is not allowed to cause the image forming apparatus 200 to perform NFC touch-to-print printing, and hence security in NFC touch-to-print printing is reliably ensured.

Next, a description will be given of a printing method using NFC communication according to a second embodiment of the present invention.

The present embodiment is basically the same as the first embodiment described above in terms of constructions and operations, and thus description of corresponding constructions and operations is omitted, only different constructions and operations being described below.

In recent years, from the standpoint of security improvement, available functions of image forming apparatuses are allowed to be set with respect to each user. In such an image forming apparatus, when registering users in the image forming apparatus, an administrator sets available functions of the image forming apparatus with respect to each of the users using a database or the like.

FIG. 10 is a view useful in explaining a user information database 1000 which is used in the present embodiment and in which available functions are set with respect to each user.

Similarly to the user information database 410, the user information database 1000 is stored in the storage unit 305 of the image forming apparatus 200.

The user information database 1000 is for use in performing authentication in step S1102 in a process of FIG. 11, to be described later, and determining in step S1104 whether or not a user has the authority to perform NFC touch-to-print printing. In the user information database 1000, ID information on users is set in an ID column 1001. In the present embodiment, for example, user 1, user 2, and user 3 are set as ID information on three users. In a password column 1002, password information corresponding to respective pieces of ID information is set. In the present embodiment, for example, pass 1, pass 2, and pass 3 are set for user 1, user 2, and user 3, respectively.

Also, in the user information database 1000, whether or not each of a plurality of functions the image forming apparatus 100 has is available is set with respect to each user. Specifically, a copy column 1003, a FAX column 1004, a PC-PRINT column 1005, and an NFC touch-to-print printing column 1006 are set as authority information. In each column, "OK" means that a user concerned is authorized to use the function, and "NG" means that the concerned user is not authorized to use the function.

The copy column 1003 shows authorities of respective users to use the copy function, and in the present embodiment, user 1, user 2, and user 3 have the authority to use the copy function. The FAX column 1004 shows authorities of respective users to use the FAX function, and in the present embodiment, user 1 and user 2 have the authority to use the FAX function. The PC-PRINT column 1005 shows authorities of respective users to use the PC-PRINT function, and in the present embodiment, user 1 and user 2 have the authority to use the PC-PRINT function. The NFC touch-to-print printing column 1006 shows authorities of respective users to use the NFC touch-to-print printing function, and in the present embodiment, only user 1 has the authority to use the NFC touch-to-print printing function.

With the printing method using NFC communication according to the present embodiment as well, a process at startup of the image forming apparatus 200, a process at the time of user authentication by the image forming apparatus 200, and a process at the time of establishment of NFC communication between the image forming apparatus 200 and the mobile terminal 100 are carried out in order as with the first embodiment. It should be noted that the process at startup of the image forming apparatus 200 is the same as the process at startup of the image forming apparatus 200 according to the first embodiment, and therefore, description thereof is omitted.

First, a description will now be given of a process at the time of user authentication by the image forming apparatus 200 according to the present embodiment. It should be noted that in the process at the time of user authentication according to the present embodiment as well, a user of the mobile terminal 100 owns an IC card (not shown), and this IC card and the IC card reader 216 of the image forming apparatus 200 are used.

Figure 11:
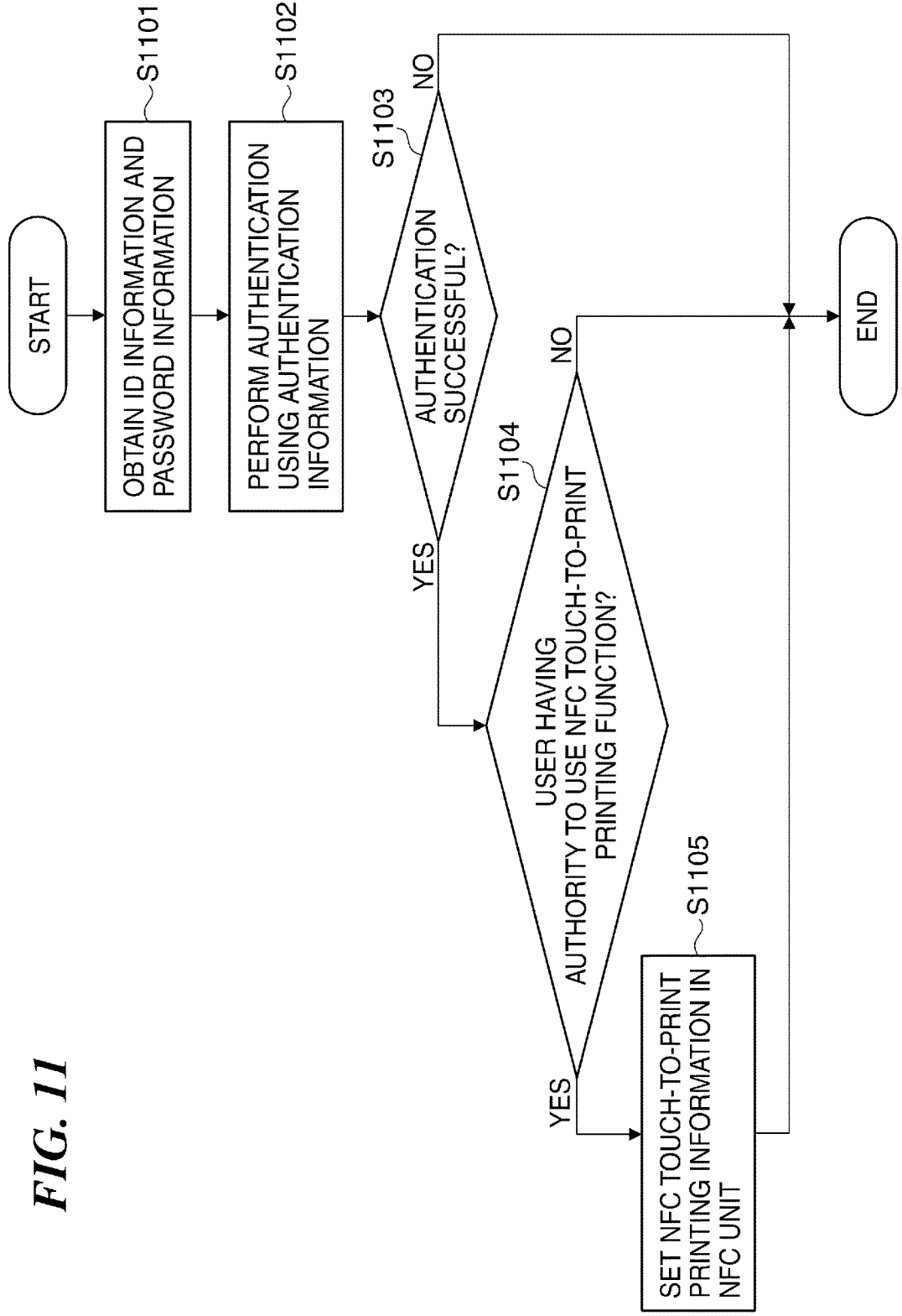
FIG. 11 is a flowchart showing a user authentication process carried out by the image forming apparatus according to the second embodiment of the present invention.

FIG. 11 is a flowchart showing a user authentication process carried out by the image forming apparatus 200.

Referring to FIG. 11, first, the IC card reader control unit 307 of the image forming apparatus 200 causes the IC card reader 216 to obtain ID information and password information on the user from the IC card by way of the IC card reader I/F 215 (step S1101).

Next, the authentication control unit 308 performs authentication of the user by comparing the obtained ID information and password information with the user information database 1000 (authentication information) stored in the storage unit 305 (step S1102) and determines whether or not authentication of the user is successful (step S1103).

As a result of the determination in the step S1103, when authentication of the user is successful (YES in the step S1103), the authentication control unit 308 determines whether or not the authenticated user has the authority to use the NFC touch-to-print printing function by comparing the ID information on the authenticated user with the user information database 1000 (step S1104).

As a result of the determination in the step S1104, when the authenticated user has the authority to use the NFC touch-to-print printing function (YES in the step S1104), the NFC control unit 306 sets NFC touch-to-print printing information as an NDEF record in the NFC unit 209 by way of the NFC I/F 208 (step S1106) and terminates the present process. Specifically, NFC touch-to-print printing information is written into memory of the NFC unit 209 in the step S1105. It should be noted that the NFC touch-to-print printing information set as the NDEF record in the present embodiment is the same as the NFC touch-to-print printing information in FIG. 7.

On the other hand, as a result of the determination in the step S1103, when authentication of the user is unsuccessful (NO in the step S1103), or as a result of the determination in the step S1104, when the authenticated user does not have the authority to use the NFC touch-to-print printing function, the present process is immediately terminated. It should be noted that in the present embodiment as well, the initialized state of the NFC unit 209 is maintained when authentication of the user is unsuccessful or when the authenticated user does not have the authority to use the NFC touch-to-print printing function.

A description will now be given of a process carried out when NFC communication is established between the image forming apparatus 200 and the mobile terminal 100 according to the present embodiment.

In the present embodiment, as shown in the user information database 1000, there are users who have the authority to use the NFC touch-to-print printing function and users who do not have the authority to use the NFC touch-to-print printing function. In this case, even if a user who does not have the authority to use the NFC touch-to-print printing function tries to cause the image forming apparatus 200 to perform the NFC touch-to-print printing function, the image forming apparatus 200 discontinues NFC touch-to-print printing.

However, the image forming apparatus 200 discontinues NFC touch-to-print printing without sending any information to the mobile terminal 100 a user has, the user does not know the cause of a failure in NFC touch-to-print printing. To cope with this, in the present embodiment, the present process is carried out so that a user who does not have the authority to use the NFC touch-to-print printing function can know the cause of a failure in NFC touch-to-print printing.

Figure 12:
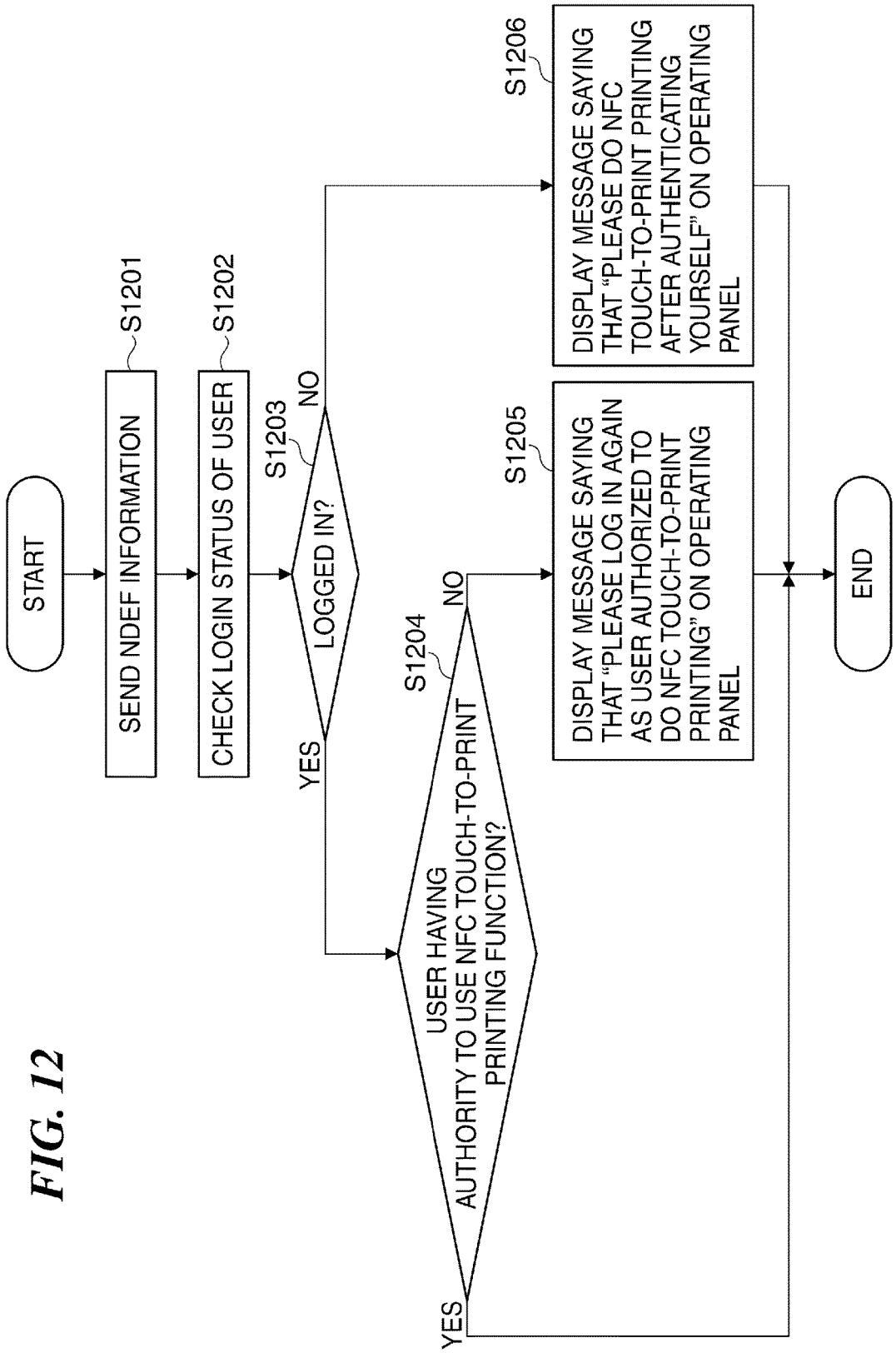
FIG. 12 is a flowchart showing a user authority checking process which is carried out by the image forming apparatus according to the second embodiment of the present invention.

FIG. 12 is a flowchart showing a user authority checking process which is carried out by the image forming apparatus 200.

Referring to FIG. 12, first, when the mobile terminal 100 running in a card emulation mode is placed within an NFC communication zone of the image forming apparatus 200, and further, the image forming apparatus 200 detects the mobile terminal 100, NFC communication is established between the mobile terminal 100 and the image forming apparatus 200.

Next, the NFC control unit 306 of the image forming apparatus 200 sends NDEF information set in the NFC unit 209 to the mobile terminal 100 (step S1201). When authentication of a user was successful in the step S1103, and further, this user has the authority to use the NFC touch-to-print printing function, NFC touch-to-print printing information is sent as NDEF information to the mobile terminal 100. On the other hand, when authentication of the user was unsuccessful in the step S1103, or when this user does not have the authority to use the NFC touch-to-print printing function, the initialized state of the NFC unit 209 is maintained, and hence substantially no information is sent as NDEF information to the mobile terminal 100.

Then, the authentication control unit 308 of the image forming apparatus 200 checks if the user has logged in to the image forming apparatus 200 (step S1202) and determines whether or not the user has logged in to the image forming apparatus 200 (step S1203).

Figure 13:
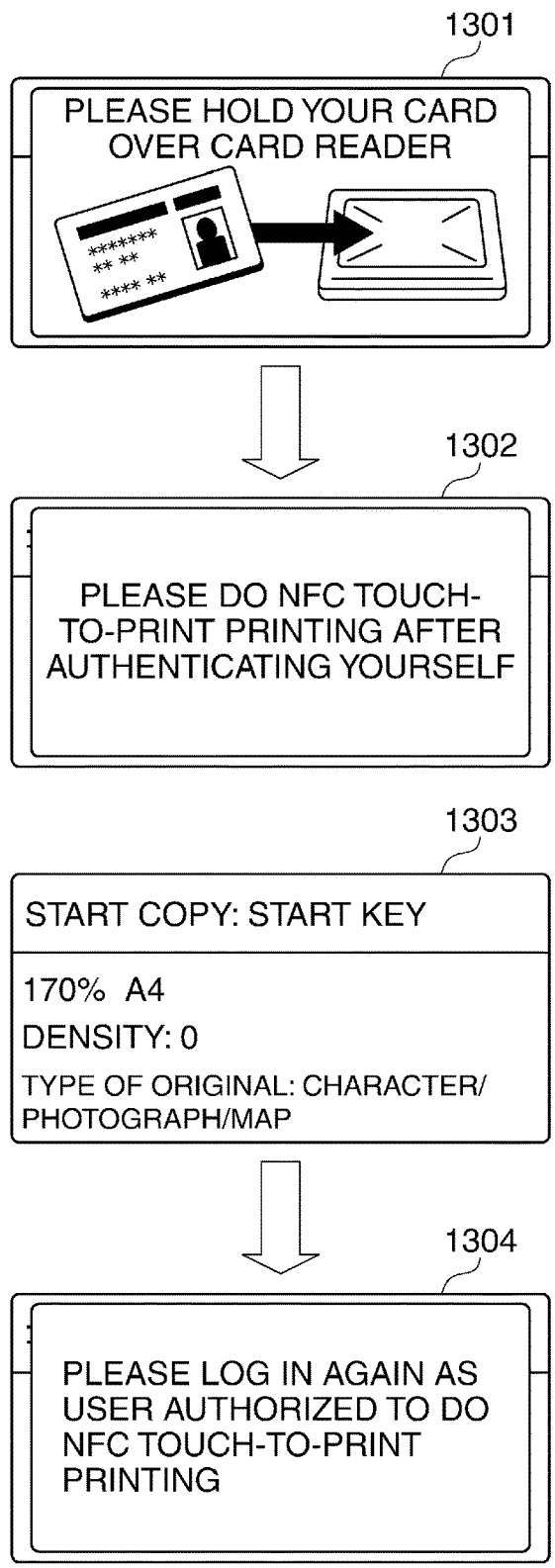
FIG. 13 is a view useful in explaining a change in display on a display panel which is made when it is determined in step 1203 in FIG. 8 that a user has logged out of the image forming apparatus.

As a result of the determination in the step S1203, when the user has logged out of the image forming apparatus 200 (NO in the step S1203), the image forming apparatus 200 changes the display on the display panel 314 from a login awaiting display 1301 as shown in FIG. 13 to a display 1302 which prompts authentication (login) of the user such as a message saying that "Please do NFC touch-to-print printing after authenticating yourself" (step S1206). After that, the image forming apparatus 200 discontinues NFC touch-to-print printing and terminates the present process.

On the other hand, when the user has logged in to the image forming apparatus 200 (YES in the step S803), the authentication control unit 308 of the image forming apparatus 200 determines whether or not the user who has logged in has the authority to use the NFC touch-to-print printing function by comparing ID information on the user who has logged in with the user information database 1000 (step S1204).

As a result of the determination in the step S1204, when the user who has logged in has the authority to use the NFC touch-to-print printing function (YES in the step S1204), the image forming apparatus 200 performs NFC touch-to-print printing and terminates the present process. It should be noted that when the user who has logged in has the authority to use the NFC touch-to-print printing function, this means that NFC touch-to-print printing information was set as an NDEF record in the step S1105, and hence NDEF information sent to the image forming apparatus 200 is NFC touch-to-print printing information. Therefore, the user of the mobile terminal 100 is allowed to cause the image forming apparatus 200 to perform NFC touch-to-print printing.

On the other hand, as a result of the determination in the step S1204, when the user who has logged in does not have the authority to use the NFC touch-to-print printing function (NO in the step S1204), the display on the display panel 314 is changed from a normal status display 1303 as shown in FIG. 13 to a display 13004 which prompts re-authentication (login) of a user who has the authority to use the NFC touch-to-print printing function, for example, a message saying that "a user authorized to perform NFC touch-to-print printing is required to log in again" (step S1205). After that, the image forming apparatus 200 discontinues NFC touch-to-print printing and terminates the present process.

According to the process in FIG. 12, when a user has logged in to the image forming apparatus 200 has the authority to use the NFC touch-to-print printing function, this user is allowed to cause the image forming apparatus 200 to perform NFC touch-to-print printing, and this prevents NFC touch-to-print printing from being performed by every user.

Moreover, according to the process in FIG. 12, in the case where NFC touch-to-print printing is discontinued when a user who does not have the authority to use the NFC touch-to-print printing function tries to cause the image forming apparatus 200 to perform NFC touch function, the display 1304 which prompts re-authentication of a user who has the authority to use the NFC touch-to-print printing function is displayed on the display panel 314, and hence the user knows the reason why NFC touch-to-print printing has been discontinued (the user does not have the authority to use the NFC touch-to-print printing function).

Further, according to the process in FIG. 11, when at the time of user authentication by the image forming apparatus 200, an authenticated user does not have the authority to use the NFC touch-to-print printing function, the initialized state of the NFC unit 209 is maintained, and therefore, even when NFC communication is established after that, and NDEF information is sent to the mobile terminal 100, the user of the mobile terminal 100 is not allowed to cause the image forming apparatus 200 to perform NFC touch-to-print printing based on the sent NDEF information. Namely, a user who does not have the authority to use the NFC touch-to-print printing function is not allowed to cause the image forming apparatus 200 to perform NFC touch-to-print printing, and hence security in NFC touch-to-print printing is reliably ensured.

Next, a description will be given of a printing method using NFC communication according to a third embodiment of the present invention.

The present embodiment is basically the same as the first embodiment described above in terms of constructions and operations, and thus description of corresponding constructions and operations is omitted, only different constructions and operations being described below.

As described above, the mobile terminal 100 such as a smartphone typically has the liquid crystal panel 101 which displays characters and images, and in NFC touch-to-print printing as well, a user of the mobile terminal 100 is more likely to gaze at the liquid crystal panel 101 than at the display panel 314 of the image forming apparatus 200. Accordingly, in the present embodiment, for example, when NFC touch-to-print printing is discontinued due to unsuccessful authentication of a user, a message to this effect is displayed on the liquid crystal panel 101 of the mobile terminal 100.

With the printing method using NFC communication according to the present embodiment as well, a process at startup of the image forming apparatus 200, a process at the time of user authentication by the image forming apparatus 200, and a process at the time of establishment of NFC communication between the image forming apparatus 200 and the mobile terminal 100 are carried out in order as with the first embodiment. It should be noted that the process at the time of establishment of NFC communication between the image forming apparatus 200 and the mobile terminal 100 according to the present embodiment is the same as the process at the time of establishment of NFC communication between the image forming apparatus 200 and the mobile terminal 100 according to the first embodiment, and therefore, description thereof is omitted.

First, a description will be given of the process at startup of the image forming apparatus 200 according to the present embodiment.

Figure 14:
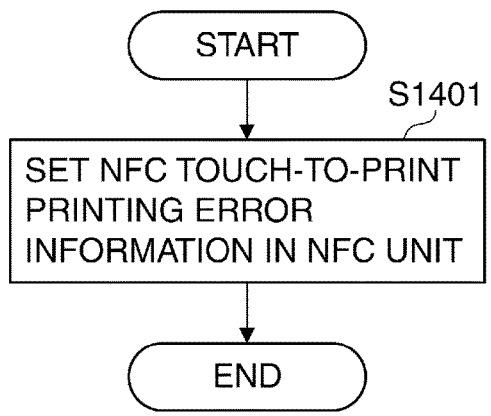
FIG. 14 is a flowchart showing an NFC unit initialization process which is carried out at the start of the image forming apparatus according to a third embodiment of the present invention.

FIG. 14 is a flowchart showing an NFC unit initialization process which is carried out at startup of the image forming apparatus 200.

Referring to FIG. 14, the NFC control unit 306 of the image forming apparatus 200 sets NFC touch-to-print printing error information, which is NDEF information, as an NDEF record in the NFC unit 209 by way of the NFC I/F 208 (step S1401). Specifically, in the step S1401, NFC touch-to-print printing error information is written into memory of the NFC unit 209. After that, the present process is terminated.

NFC touch-to-print printing error information set in the present embodiment is information including a uniform resource locator (URI) for accessing a Web UI of the image forming apparatus 200 from a browser displayed on the liquid crystal panel 101 of the mobile terminal 100 to which the NFC touch-to-print printing error information has been sent. When the Web UI is accessed, an error message saying that NFC touch-to-print printing has been discontinued (information relating to unexecuted printing) is displayed on the liquid crystal panel 101 of the mobile terminal 100.

The Web UI of the image forming apparatus 200 is a UI (user interface) which is allowed to be operated from the mobile terminal 100 when the mobile terminal 100 accesses the image forming apparatus 200 via the browser. When the mobile terminal 100 is to access the image forming apparatus 200, the image forming apparatus 200 receives an HTTP request from the mobile terminal 100 using the HTTP control unit 309, and the Web UI control unit 304 generates a Web UI content and sends an HTTP response to the mobile terminal 100 by way of the HTTP control unit 309. This implements the Web UI. It should be noted that in the present embodiment, the Web UI content generated by the Web UI control unit 304 is the error message described above.

Even when a user logs out of the image forming apparatus 200 which he or she has logged into (by which he or she has been authenticated), the process in FIG. 14 is carried out in which the NFC control unit 306 sets NFC touch-to-print printing error information as an NDEF record in the NFC unit 209 (step S1401). After that, the present process is terminated.

Figure 15:
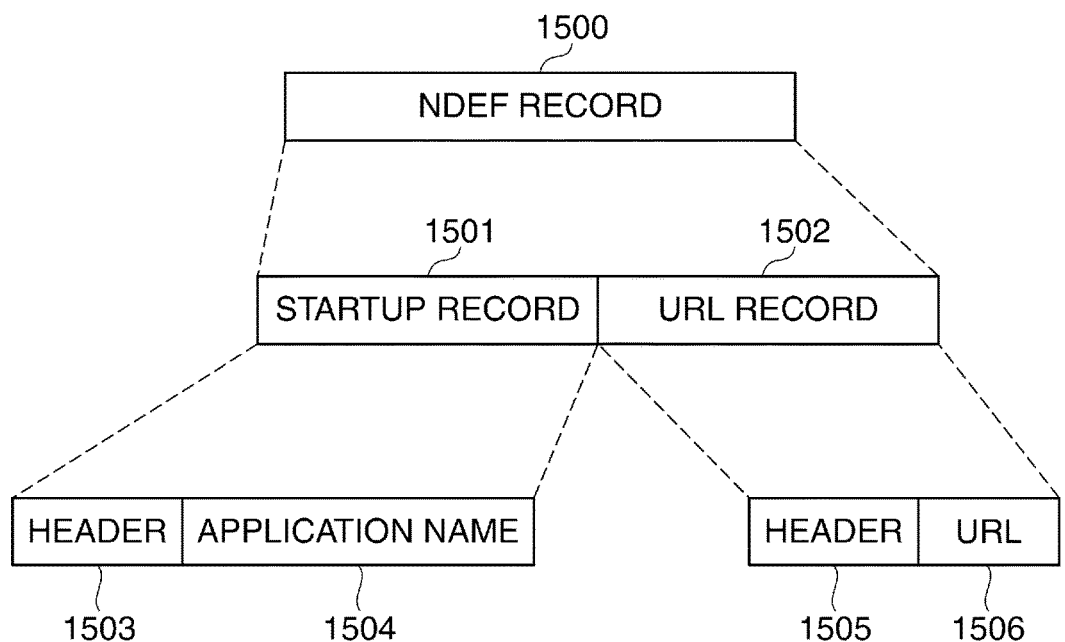
FIG. 15 is a view useful in explaining an arrangement of NFC touch-to-print printing error information set as an NDEF record of the NFC unit in step S1401 in FIG. 14.

FIG. 15 is a view useful in explaining an arrangement of the NFC touch-to-print printing error information set as the NDEF record of the NFC unit 209 in the step S1401 in FIG. 14.

Referring to FIG. 15, the NDEF record 1500 in which the NFC touch-to-print printing error information is set has a startup record 1501 for starting the browser, and a URI record 1502 in which information required to start the browser is stored.

In the startup record 1501, startup information for causing the mobile terminal 100, to which the NFC touch-to-print printing error information is sent, to start the browser. Specifically, the startup record 1501 is comprised of a header 1503 in which header information on the startup information is set, and an app name 1504 in which a name of an application required to start the browser (hereafter referred to merely as "the startup application") is set. Here, in the header 1503, information indicating that the startup record 1501 is a record for starting the browser is set in a format defined by the NFC forum. A character string including a name of NFC touch-to-print printing is set as an application name 1504.

The URI record 1502 is comprised of a header 1505 and a URL 1506. In the header 1505, information indicating that the URL 1506 is a record in which a URL is stored is set in a format defined by the NFC forum. URL information for use when the browser started in the mobile terminal 100 accesses the Web UI of the image forming apparatus 200 using HTTP is set as the URL 1506.

When the NDEF record 1500 described above is sent to the mobile terminal 100, the mobile terminal 100 in turn accesses the Web UI of the image forming apparatus 200 based on the URL 1506 and displays a Web UI content, that is, an error message on the liquid crystal panel 101.

Figure 16:
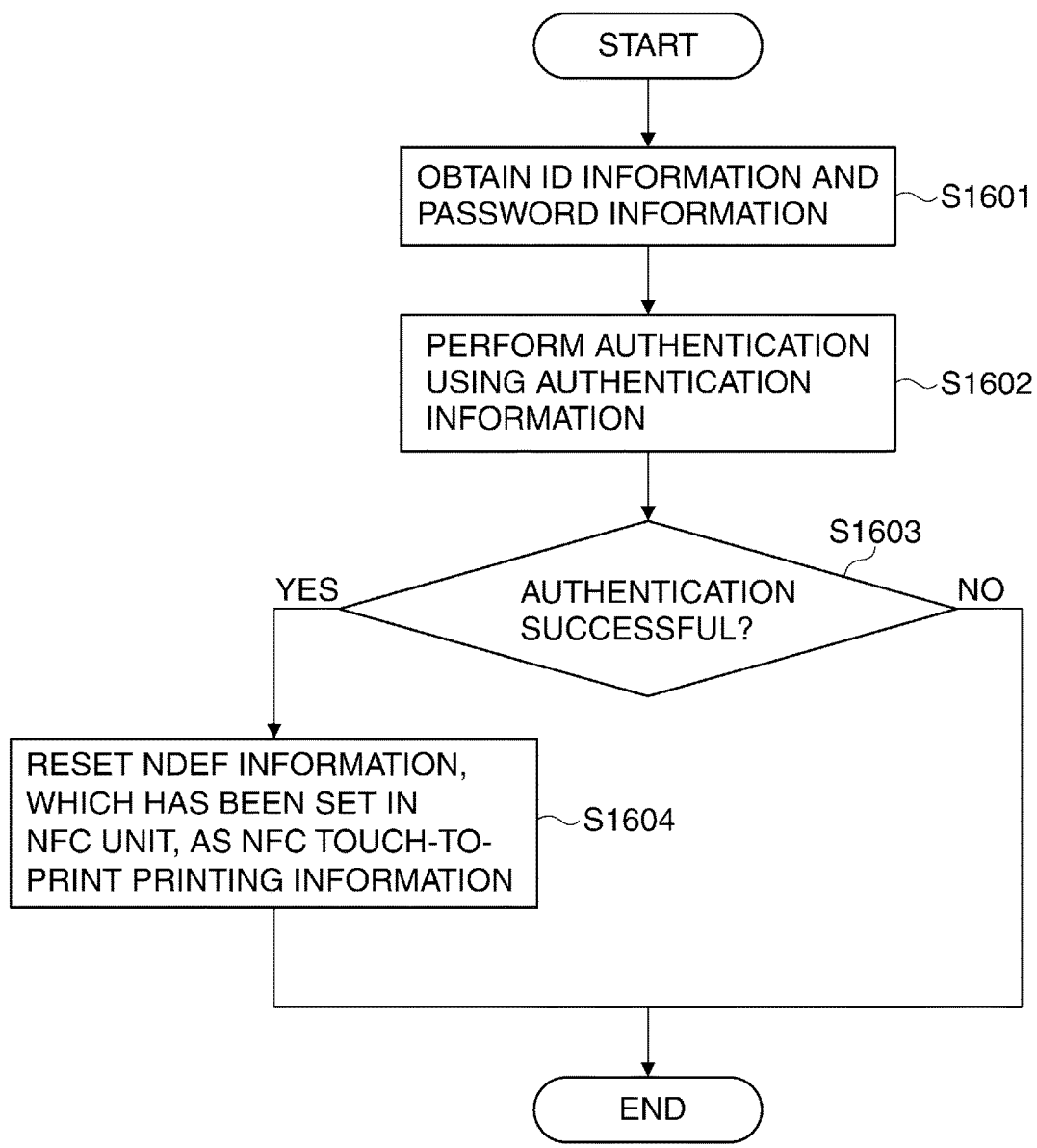
FIG. 16 is a flowchart showing a user authentication process carried out by the image forming apparatus according to the third embodiment of the present invention.

FIG. 16 is a flowchart showing a user authentication process which is carried out by the image forming apparatus 200.

Referring to FIG. 16, first, the IC card reader control unit 307 of the image forming apparatus 200 causes the IC card reader 216 to obtain ID information and password information on the user from the IC card by way of the IC card reader I/F 215 (step S1601).

Next, the authentication control unit 308 performs authentication of the user by comparing the obtained ID information and password information with the user information database 410 (authentication information) stored in the storage unit 305 (step S1602) and determines whether or not authentication of the user is successful (step S1603).

As a result of the determination in the step S1603, when authentication of the user is successful (YES in the step S1603), the NFC control unit 306 sets NFC touch-to-print printing information as an NDEF record in the NFC unit 209, in which NFC touch-to-print printing error information is set, by way of the NFC I/F 208 (step S1604) and terminates the present process. Specifically, in the step S1604, NFC touch-to-print printing information is written into memory of the NFC unit 209.

On the other hand, when authentication of the user is unsuccessful (NO in the step S1603), the present process is immediately terminated. Namely, when authentication of the user is unsuccessful, NFC touch-to-print printing error information is still set as an NDEF record in the NFC unit 209.

After that, as a process at the time of establishment of NFC communication between the image forming apparatus 200 and the mobile terminal 100, the user authority checking process in FIG. 8 is carried out by the image forming apparatus 200.

For example, when the user has logged in to the image forming apparatus 200 (YES in the step S803), this means that it is determined that authentication of the user was successful in the step S1603, and hence NDEF information sent to the image forming apparatus 200 is NFC touch-to-print printing information. Therefore, the image forming apparatus 200 performs NFC touch-to-print printing.

On the other hand, when the user has logged out of the image forming apparatus 200 (NO in the step S803), this means that it is determined that authentication of the user was unsuccessful in the step S1603. At this time, the image forming apparatus 200 changes the display on the display panel 314 to, for example, a message saying that "Please do NFC touch-to-print printing after authenticating yourself" (step S804) and discontinues NFC touch-to-print printing.

Also, as a process at the time of establishment of NFC communication between the image forming apparatus 200 and the mobile terminal 100, the display on the liquid crystal panel 101 is changed in the mobile terminal 100 as will be described below.

Figure 17:
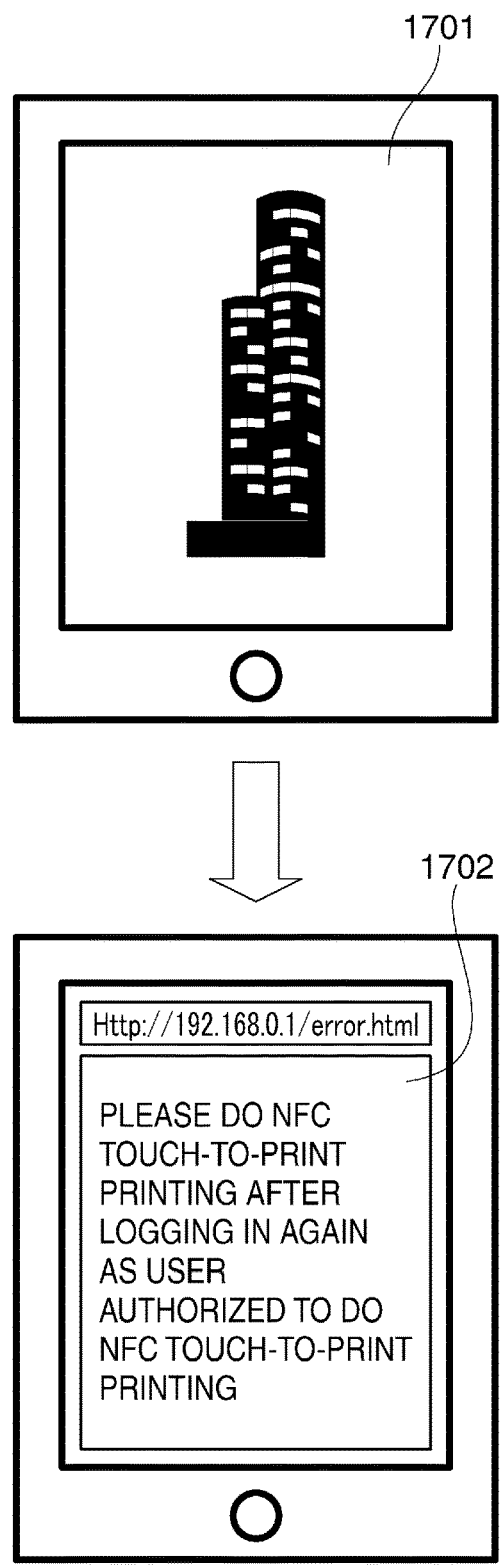
FIG. 17 is a view useful in explaining a change in display on a liquid crystal panel of a mobile terminal at the time of establishment of an NFC communication between the image forming apparatus and the mobile terminal.
Figure 18:
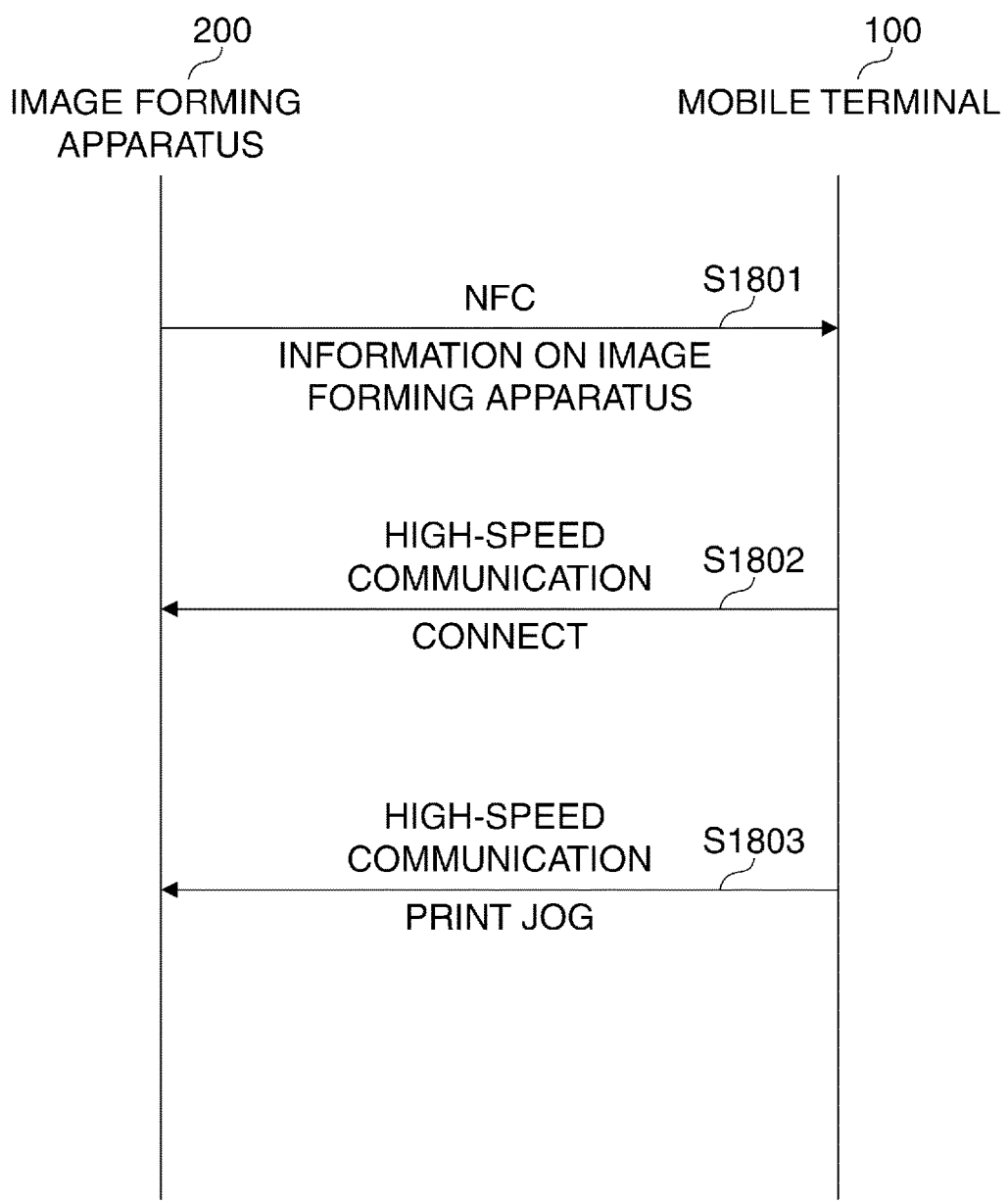
FIG. 18 is a sequence diagram useful in explaining a conventional printing method using NFC communication.

FIG. 17 is a view useful in explaining a change in the display on the liquid crystal panel 101 at the time of establishment of NFC communication between the image forming apparatus 200 and the mobile terminal 100.

The change in the display on the liquid crystal panel 101, which is shown in FIG. 17, is made when a user has not logged into the image forming apparatus 200, for example, when a user has already logged out of the image forming apparatus 200.

First, a user who tries NFC touch-to-print printing displays an image 1701 to be printed on the liquid crystal panel 101 of the mobile terminal 100 running in a card emulation mode. Next, the user moves the mobile terminal 100 into the NFC communication zone of the image forming apparatus 200. Specifically, the user touches the mobile terminal 100 to the image forming apparatus 200. At this time, NFC communication is established between the image forming apparatus 200 and the mobile terminal 100.

Here, when the user has not logged into the image forming apparatus 200, this means that authentication of the user was unsuccessful in the step S1603, and hence NFC touch-to-print printing information is still set as an NDEF record of the NFC unit 209. Therefore, NDEF information sent from the image forming apparatus 200 to the mobile terminal 100 is NFC touch-to-print printing error information, and the mobile terminal 100 receives NFC touch-to-print printing error information (NDEF record 1500). At this time, the mobile terminal 100 accesses the Web UI of the image forming apparatus 200 based on the URL 1506 and displays a Web UI content, that is, an error message 1702 on the liquid crystal panel 101.

The above described change in the display on the liquid crystal panel 101 is made when a user has not logged into the image forming apparatus 200, and also, when a user who tries NFC touch-to-print printing does not have the authority to use the NFC touch-to-print printing function, the same change in the display is made. In this case, however, the user authentication process in FIG. 11 is carried out by the image forming apparatus 200 as a precondition. For example, when an authenticated user does not have the authority to use the NFC touch-to-print printing function, NFC touch-to-print printing error information is still set in an NDEF record of the NFC unit 209 in the process in FIG. 11.

Specifically, NDEF information sent from the image forming apparatus 200 to the mobile terminal 100 is NFC touch-to-print printing error information, and the mobile terminal 100 receives NFC touch-to-print printing error information (NDEF record 1500). At this time, the mobile terminal 100 accesses the Web UI of the image forming apparatus 200 based on the URL 1506 and displays on the liquid crystal panel 101 a Web UI content, that is, the error message 1702 as a Web UI content saying that, for example, "Please do NFC touch-to-print printing after logging in again as a user authorized to do NFC touch-to-print printing".

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-151863, filed Jul. 25, 2014, which is hereby incorporated by reference herein in its entirety.

What is claimed is:

1. A printing apparatus having a user authentication function, comprising:
    an NFC (near-field communication) communicator including a memory and configured to perform a near field communication with a mobile terminal;
    a memory device configured to store instructions; and
    a processor connected to the memory device and configured to execute the instructions to:
        store connecting information including at least identification information of the printing apparatus in the memory of the NFC communicator in a case where a user logs into the printing apparatus through the authentication function, the connecting information permitting the user to perform NFC touch-to-print printing by connecting the mobile terminal to the printing apparatus; and
        store error information for causing the mobile terminal to display an error message in the memory of the NFC communicator in a case where the user logs out of the printing apparatus, the error information notifying a user of the mobile terminal to place the mobile terminal in proximity to the NFC communicator again after logging into the printing apparatus,
    wherein in a case where the mobile terminal is placed in proximity to the NFC communicator in a state where the connecting information is stored in the memory of the NFC communicator, the connecting information is sent to the mobile terminal by the near field communication to permit the user to perform NFC touch-to-print printing by connecting the mobile terminal to the printing apparatus using the connecting information, and
    wherein in a case where the mobile terminal is placed in proximity to the NFC communicator in a state where the error information is stored in the memory of the NFC communicator, the error information is sent to the mobile terminal by the near field communication to notify the user to log into the printing apparatus prior to performing NFC touch-to-print printing by connecting the mobile terminal to the printing apparatus.

2. The printing apparatus according to claim 1, wherein the processor is further configured to execute instructions to store the error information in the memory of the NFC communicator at startup of the printing apparatus.

3. The printing apparatus according to claim 1, wherein the identification information is an IP address or a MAC address of the printing apparatus.

4. The printing apparatus according to claim 1, further comprising a card reader configured to read an IC card, wherein the user authentication function is performed based on user information read from the IC card by the card reader.

5. A control method for a printing apparatus having a user authentication function and equipped with an NFC communicator for performing near field communication with a mobile terminal, the NFC communicator having a memory, the control method comprising:
    storing connecting information including at least identification information of the printing apparatus in the memory of the NFC communicator in a case where a user logs into the printing apparatus through the authentication function, the connecting information permitting the user to perform NFC touch-to-print printing by connecting the mobile terminal to the printing apparatus; and
    storing error information for causing the mobile terminal to display an error message in the memory of the NFC communicator in a case where the user logs out of the printing apparatus, the error information notifying a user of the mobile terminal to place the mobile terminal in proximity to the NFC communicator again after logging into the printing apparatus,
    wherein in a case where the mobile terminal is placed in proximity to the NFC communicator in a state where the connecting information is stored in the memory of the NFC communicator, the connecting information is sent to the mobile terminal by the near field communication to permit the user to perform NFC touch-to-print printing by connecting the mobile terminal to the printing apparatus using the connecting information, and
    wherein in a case where the mobile terminal is placed in proximity to the NFC communicator in a state where the error information is stored in the memory of the NFC communicator, the error information is sent to the mobile terminal by the near field communication to notify the user to log into the printing apparatus prior to performing NFC touch-to-print printing by connecting the mobile terminal to the printing apparatus.

* * * * *